United States Patent [19]

Sargent

[11] Patent Number: 4,502,222
[45] Date of Patent: Mar. 5, 1985

[54] SHEARS FOR CUTTING SHEET METAL

[75] Inventor: Claud B. Sargent, Visalia, Calif.

[73] Assignee: Michael P. Breston, Houston, Tex.; a part interest

[21] Appl. No.: 447,093

[22] Filed: Dec. 6, 1982

[51] Int. Cl.³ .............................................. B26B 13/06
[52] U.S. Cl. ........................................ 30/251; 30/259
[58] Field of Search ............... 30/248, 250, 251, 252, 30/238, 244, 249, 257, 259, 224

[56] References Cited

U.S. PATENT DOCUMENTS

| | | | |
|---|---|---|---|
| 540,464 | 6/1895 | Stockmann | 30/257 |
| 766,298 | 8/1904 | Devaux | 30/250 X |
| 1,362,599 | 12/1920 | Buell | 30/250 X |
| 2,564,154 | 8/1951 | Compton | 30/238 |
| 3,143,799 | 8/1964 | Gover | 30/259 |
| 4,462,157 | 7/1984 | Aiken | 30/259 |

FOREIGN PATENT DOCUMENTS

| | | | |
|---|---|---|---|
| 639533 | 3/1928 | France | 30/257 |
| 197360 | 7/1938 | Switzerland | 30/257 |

*Primary Examiner*—Jimmy C. Peters
*Attorney, Agent, or Firm*—Michael P. Breston

[57] ABSTRACT

The shears have two levers pivoted together, each having a cutting edge at the forward end thereof and an operating handle at the rear end thereof. The lower lever has a hinge hub forming a bearing surface which is laterally offset with respect to its cutting edge and which projects forwardly and upwardly toward its cutting edge.

4 Claims, 11 Drawing Figures

U.S. Patent  Mar. 5, 1985  Sheet 1 of 2  4,502,222
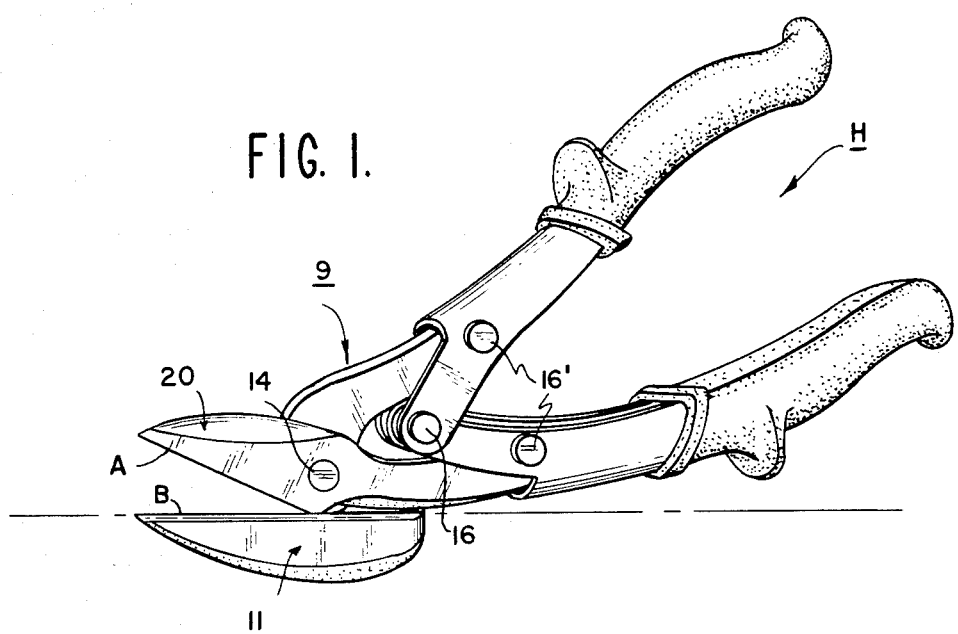
FIG. 1.
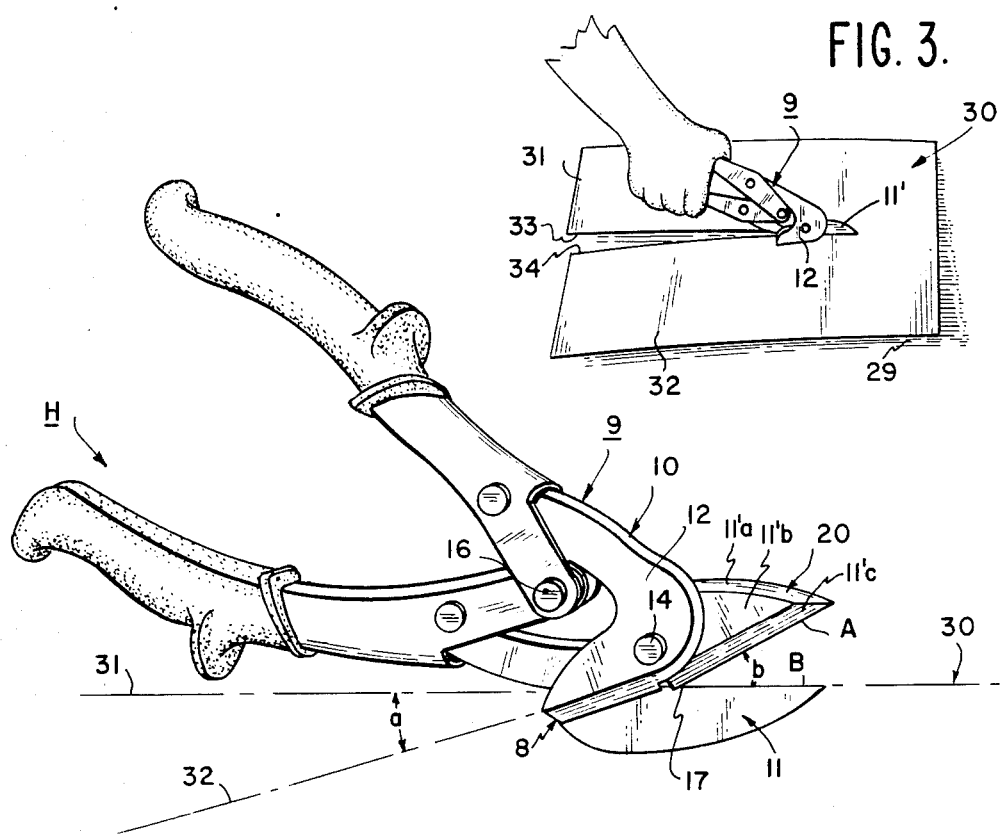
FIG. 3.
FIG. 2.

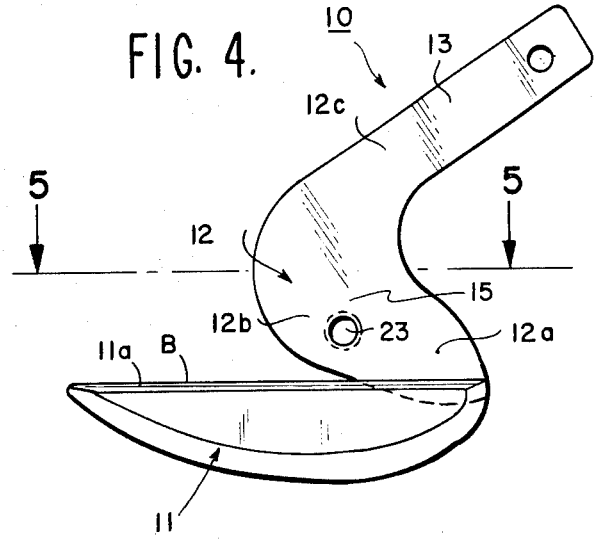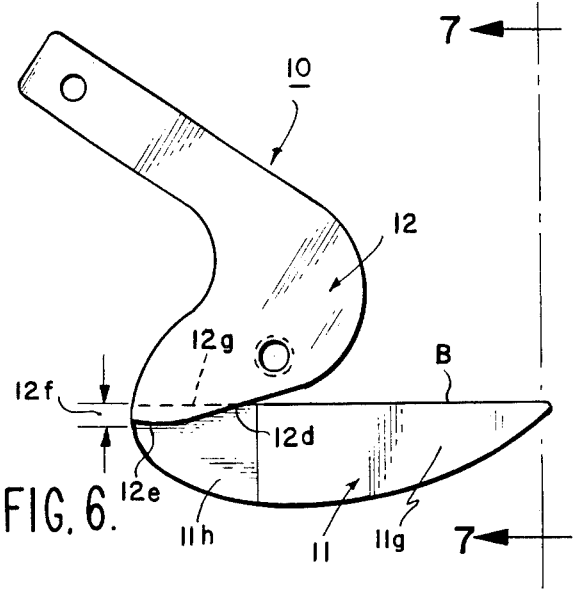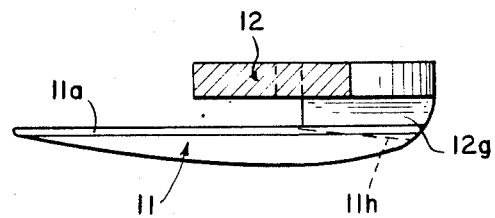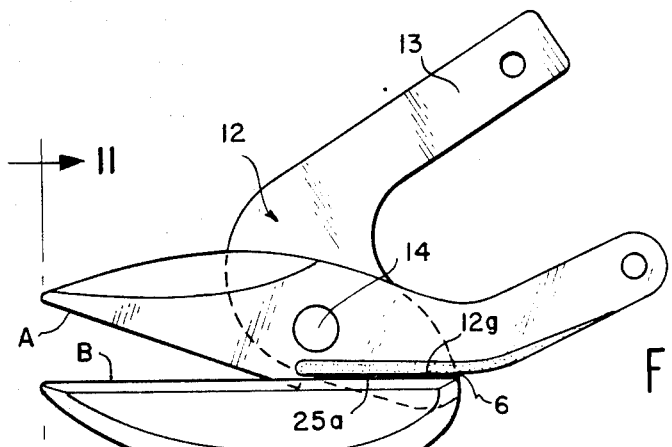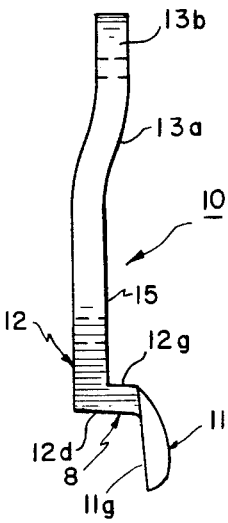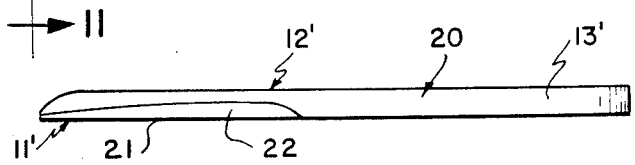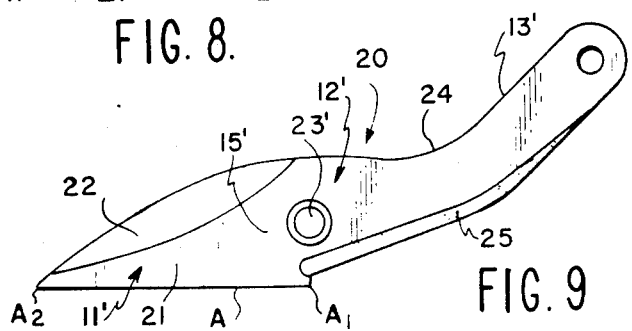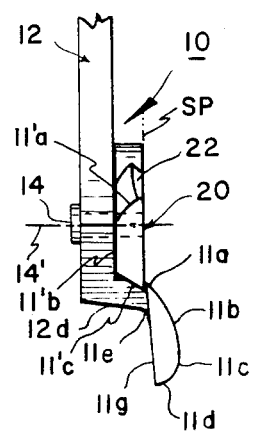

SHEARS FOR CUTTING SHEET METAL

BACKGROUND OF THE INVENTION

1. Field of the Invention

This invention relates, in general, to shears and finds its greatest utility in the cutting of sheet metal or other sheet material which is comparable in stiffness to sheet metal.

The shears of this invention are primarily concerned with shearing material in a straight or slightly curved line without damaging or disfiguring the material as it is being sheared, with facilitating the displacements of the cut edges from a work sheet relative to the levers of the shears, and with making it easier and safer for the operator to use the shears.

Various such shears have been proposed and described in the patent literature, but the shears that are now most widely commercially employed fail to meet the objectives as herein above set forth, even though the patent literature on shears shows a full awareness of the problems encountered in using presently available commercial shears.

SUMMARY OF THE INVENTION

The shears have two levers pivoted together, each having a cutting edge at the forward end thereof and an operating handle at the rear end thereof. The lower lever has a hinge hub forming a bearing surface which is laterally offset with respect to its cutting edge and which projects forwardly and upwardly toward its cutting edge. The upper lever has a hinge hub forming a bearing surface which is substantially in the same plane as its cutting edge. These hubs carry the pivot about which the levers pivot. The hinge hubs are positioned to advance the pivot axis forwardly relative to the proximate point of intersection between the cutting edges. This point of intersection travels from the proximate point to the distal point in the shearing plane.

BRIEF DESCRIPTION OF THE DRAWINGS

FIG. 1 is an elevation view of the front side of the shears constructed in accordance with the present invention;

FIG. 2 is an elevation view of the back side of the shears shown in FIG. 1;

FIG. 3 shows the shears in the process of cutting a flat metal sheet;

FIG. 4 is an elevation view of the front side of the lower lever;

FIG. 5 is a transverse sectional view taken along line 5—5 of FIG. 4;

FIG. 6 is an elevation view of the back side of the lower lever;

FIG. 7 is an end view taken along lines 7—7 of FIG. 6;

FIG. 8 is a top view of the upper lever;

FIG. 9 is an elevation view of the front side of the upper lever;

FIG. 10 is an elevation view of the front side of the shears, similar to FIG. 1, but without the handles; and FIG. 11 is a fragmentary end view taken along line 11—11 of FIG. 10.

DETAILED DESCRIPTION OF THE PREFERRED EMBODIMENT

With reference to the drawings, the lever shears of this invention, generally designated as 9, comprise a pair of levers 10 and 20 that are pivoted about a pivot bolt 14.

Levers 10 and 20 are secured by bolts 16' to a pair of standard compound handles H commonly used on sheet metal shears. Handles H are pivoted on a pivot 16 and are spring-biased by a compression spring which constantly urges the handles to move apart.

General Description of Levers 10 and 20

Lower lever 10 is of unitary and integral construction and is characterized by portions thereof having special geometric shapes and positions relative to each other and to lever 20 so as to best promote the shearing action even on a stiff metal sheet 30, which can be flat, corrugated, or in any other shape, along a straight or slightly curved line, without damaging or disfiguring the material as it is being sheared.

As a result of the shearing action, the cut edges 33, 34 (FIG. 3) spread apart vertically in the shear plane SP (FIG. 11) to produce two metal pieces 31 and 32.

Upper lever 20 is also of unitary construction but of more streamlined geometric shape. Lever 20 assists lever 10 to achieve optimum and versatile performance, such as the enhancement of the shearing action and the expeditious transport through the shears of the two cut portions 31, 32 of metal sheet 30.

The lower lever 10 includes a lower blade 11 having a cutting edge B, a hinge hub 12 which is laterally offset away from blade 11, and a handle coupling 13.

The upper lever 20 has a blade 11', a hinge hub 12', and a handle coupling 13', all being in substantial longitudinal alignment, as best seen in FIGS. 8, 9.

The handle coupling 13 of lower lever 10 is laterally offset from the hinge hug 12 (FIG. 7) toward blade 11 to come materially into vertical alignment with the hand coupling 13' of upper lever 20, so that both couplings 13, 13' can be oscillated by the spring-loaded, pivoted-pair of handles H in a substantially single vertical plane, in a known manner.

The shears 9 of this invention are of the type which allow the moving handles and the hands holding them to be above the plane of sheet 30, which is known as the work plane. The arrangement is such that one cut portion, such as 31, passes through the shears substantially undeviated from the work plane 30, and the other cut portion 32 becomes deviated downwardly from portion 31 (FIG. 2). Line 31 in FIG. 2 can be considered as the cutting line. It is desired that such deviation be at a minimum to prevent excessive bending which may make a permanent kink in the deviated cut portion 32.

Detailed Description of Levers 10 and 20

Lower lever 10 has a lower blade 11 characterized by a complex external surface which includes a top portion 11a (FIG. 11) sloping straight downwardly and outwardly from cutting edge B, followed by a curved portion 11b of a relatively large radius, a curved portion 11c of a smaller radius, and a bottom inwardly tapering curved portion 11d which intersects with the back face or shear face 11g of blade 11.

The shear face 11g is directly under the cutting edge B and is followed rearwardly by a surface 11h that gradually tapers from a vertical plane passing through the intersection between line 31 containing edge B and shoulder 8 (FIG. 2) toward the external surface of blade 11. This gradual taper of surface 11h makes it possible for the shears to deviate leftward, as viewed in FIG. 3, in order to cut a left-hand curve. Without this tapered surface 11h, edge 34 of the lower end of portion 32 would but against surface 11g while attempting to cut a curve to the left of the undeviated straight edge 33. Tapered surface 11h provides space to swing the shears to the left.

The laterally offset, generally U-shaped hinge hub 12 includes a lower rear leg 12a which extends upwardly and forwardly (as viewed in FIG. 4), a middle base or hub portion 12b, and an upper leg 12c which extends upwardly and rearwardly from base 12b. Base 12b defines a transverse bore 23 and an inner, planar, bearing surface 15 (FIGS. 4, 7) which is laterally offset from the shear face 11g.

Between blade 11 and hub 12 there is a narrow, lateral shoulder 8 (FIG. 7) having a bottom face 12d and a top face 12g. Face 12d slopes downwardly and rearwardly (FIG. 6) relative to line 31 and preferably terminates in a rearwardly and upwardly sloping end portion 12e. The maximum thickness between faces 12d and 12g of shoulder 8 is designated as 12f. Face 12d blends into shear face 11g with a small curved surface 11e (FIG. 11).

Upper lever 20 has an upper blade 11' (FIG. 9) which is provided with a planar shear face 21, terminating at a bottom cutting edge A which extends from an inner point $A_1$ to an outer point $A_2$, and with a surface 22 which tapers upwardly and inwardly from shear surface 21. The exterior face of upper blade 11' has a straight downwardly and outwardly sloping top edge 11'a followed by a planar portion 11'b, and by a straight downwardly and inwardly sloping portion 11'c terminating in edge A, (FIG. 11).

Hinge hub 12' of lever 20 (FIG. 9) defines a hinge bore 23' and a bearing surface 15'. Hub 12' and handle coupling 13' have a continuous lower surface 25 which gradually tapers downwardly and inwardly. This gradual taper of surface 25 makes it possible for the shears to deviate rightward, as viewed in FIG. 3, in order to cut a right-hand curve. Without this tapered surface 25, edge 33 would but against the exterior surface of lever 20 while attempting to cut a curve to the right of straight edge 34. Tapered surface 25 provides a space 6 thereunder to swing the shears to the right allowing edge 33 to pass beneath bevel 25.

Bore 23 coincides and is in registration with bore 23' for receiving the pivot bolt 14 having a pivot axis 14' about which levers 10 and 20 pivot.

At any instant of time, the cutting edges A and B intersect at a point 17 (FIG. 2). The cutting edges A and B form therebetween the shear plane SP which is perpendicular to the pivot axis 14' and in which the cutting point 17 travels back and forth, as levers 10 and 20 are oscillated about their pivot axis 14'.

In operation, the shears 9 are typically used in a substantially vertical position on a flat support 29 with blade 11' on top and blade 11 underneath the cut portions 31 and 32. The plane which is parallel to the pivot axis 14' and which contains cutting edge B is typically known as the work plane and is represented in FIG. 3 by the uncut metal sheet 30.

When sheet 30 is cut at the cutting point 17, the cut edges 33, 34 separate from one another in the shear plane SP in a direction perpendicular to the work plane. The cut edges 33, 34 make an angle with one another corresponding to the angle "a" (FIG. 2) which cutting edge A makes with cutting edge B at that moment.

The angle of separation or deviation "a" between the cut edges 33 and 34 is impressed substantially entirely on the cut edge 34 while the cut edge 33 moves without deviation from the work plane rearwardly substantially in line with cutting edge B as represented by line 31 in FIG. 2.

The deviated cut edge 34 moves underneath shoulder 8 which does not deviate edge 34 by more than the thickness 12f. The stiffer material 30 is, the more force it takes to deviate edge 34 from edge 33 in order to allow the shears to advance forward without making a kink in cut portion 32. The smaller the thickness 12f is, without sacrificing necessary material strength, the easier it is to spread edges 33 and 34 apart as the shears are pushed forward during each shearing cycle.

It will be noted that the hinge hub 12 of lever 10 is disposed on the opposite side of the shear plane SP from its blade 11, that hub 12' and blade 11' of lever 20 are on the same side of plane SP, while the entire body of lever 20 is on the opposite side of plane SP from the body of blade 11.

The lateral offsetting of hub 12 from plane SP causes lever 10 to have a double thickness while the non-offsetting of hub 12' in lever 20 causes lever 20 to have a single thickness.

It will be appreciated that the intermediate base or hub portion 12b of the hinge hub 12 of lever 10, which projects forwardly and upwardly toward cutting edge B, appreciably advances the pivot axis 14' toward a vertical plane containing point 17 which, as previously mentioned, is the point at which cutting edges A and B intersect at any instant of time.

At the start of the cutting operation point 17 is not far advanced forwardly from a vertical plane containing pivot axis 14'. As a result, the maximum angle of separation "b" between cutting edges A and B can be made much smaller than would otherwise be the case had the pivot axis 14' not been advanced forwardly.

In addition, the forward projection of bearing surface 15 constantly prevents upper blade 11' from bending in a lateral or transverse direction away from the shear face 11g of the lower blade 11 and from the shear plane SP, as is common with most metal shears. When such lateral bending does take place, it can seriously affect the shearing action, especially when cutting non-even and stiff materials.

No attempt has been made to describe in detail the intricate configurations of each of the parts of the shears as these parts are clearly shown in the drawings and it is not believed a description thereof would add anything to an understanding of the shape of the parts in addition to the showing in the drawings. Suffice it to say that each part is designed so that it may be easily fabricated, and so that it will fit closely and neatly with its associated parts.

What is claimed is:
1. Shears for cutting sheet material, comprising:
(1) a lower lever of unitary and integral construction and having:
  (a) a blade having a cutting edge;
  (b) a front surface;
  (c) a back shear surface;
  (d) an end surface which tapers rearwardly from said shear surface toward said front surface to enable said shears to swing to the left for cutting a leftward curve in said material; and
  (e) a hinge hub which is laterally offset with respect to said cutting edge, said hub including a lower leg, and an intermediate center portion defining a transverse pivot bore and a planar bearing surface;

(2) an upper lever of unitary and integral construction and having:

(a) a blade having a cutting edge, a hinge hub extending rearwardly from said cutting edge and defining a transverse pivot bore and a bearing surface; and (b) said blade, said hinge hub, and said handle all being substantially in longitudinal alignment; and (3) a pivot extending through said bores for pivotably interconnecting said upper and lower levers.

2. The shears of claim 1, wherein said hub and said handle of said upper level define a continuous bottom surface which gradually tapers downwardly and inwardly away from said shear surface to enable said shears to swing to the right for cutting a rightward curve in said material.

3. The shears of claim 2, wherein said lower leg of said lower lever extends upwardly and forwardly from a plane containing said cutting edge; and an upper leg which extends upwardly and rearwardly from said intermediate center portion; and a handle extending rearwardly and upwardly from said upper leg.

4. Shears for cutting sheet material, comprising:

(1) a lower lever of unitary and integral construction and having:

(a) a blade having a cutting edge;

(b) a front surface which includes: a top straight portion sloping donwardly and outwardly from said cutting edge, followed by a curved portion of a relatively large radius, followed by a curved portion of a relatively smaller radius, and followed by an inwardly-tapering curved portion;

(c) a back shear surface which intersects said curved portion;

(d) an end surface which tapers rearwardly from said shear surface toward said front surface to enable said shears to swing to the left for cutting a leftward curve in said material;

(e) a hinge hub which is laterally offset with respect to said cutting edge, said hub including a lower leg which extends upwardly and forwardly from a plane containing said cutting edge, an intermediate center portion defining a transverse pivot bore and a planar bearing surface, an upper leg which extends upwardly and rearwardly from said intermediate center portion; and a handle extending rearwardly and upwardly from said upper leg; and (f) a narrow shoulder between said blade and said hub;

(2) an upper lever of unitary and integral construction and having:

(a) a blade having a cutting edge, a hinge hub extending rearwardly from said cutting edge and defining a transverse pivot bore and a bearing surface;

(b) a handle extending rearwardly of said hinge hub;

(c) said blade, said hinge hub, and said handle all being substantially in longitudinal alignment; and (d) said hub and said handle defining a continuous bottom surface which gradually tapers downwardly and inwardly away from said shear surface to enable said shears to swing to the right for cutting a rightward curve in said material; and (3) a pivot extending through said bores for pivotably interconnecting said upper and lower levers.

* * * * *